United States Patent
Steinhagen et al.

(10) Patent No.: US 6,255,901 B1
(45) Date of Patent: Jul. 3, 2001

(54) DEMODULATOR FOR ASK-MODULATED SIGNALS HAVING SMALL MODULATION DEPTH

(75) Inventors: Wolfgang Steinhagen, Mauern; Franz Prexl, Niederding, both of (DE)

(73) Assignee: Texas Instruments Deutschland, GmbH, Freising (DE)

( * ) Notice: Subject to any disclaimer, the term of this patent is extended or adjusted under 35 U.S.C. 154(b) by 0 days.

(21) Appl. No.: 09/464,091

(22) Filed: Dec. 15, 1999

(30) Foreign Application Priority Data

Dec. 16, 1998 (DE) ............................................. 198 58 099

(51) Int. Cl.[7] ............................. H03D 1/10; H04L 27/06
(52) U.S. Cl. ...................... 329/348; 329/350; 329/365; 329/370; 375/320; 455/337
(58) Field of Search ...................... 329/348, 350, 329/365, 370; 375/320; 455/337

(56) References Cited

U.S. PATENT DOCUMENTS 4,065,722 * 12/1977 Francis .................................. 329/304
5,936,462 * 8/1999 Muraishi .............................. 329/311

* cited by examiner

*Primary Examiner*—Siegfried H. Grimm
(74) *Attorney, Agent, or Firm*—Bret J. Petersen; Frederick J. Telecky, Jr.

(57) ABSTRACT

A demodulator circuit for demodulating a signal ASK-modulated with modulation pulses equal in duration, and having a small depth of modulation and large dynamic range comprises an amplitude limiter (10) through which an amplitude-dependent current flows when the amplitude of the signal to be demodulated exceeds its limiting threshold value. Furthermore comprised is an envelope detector (12) to the input of which the signal to be demodulated is applied, as well as a differentiating network (14) configured so that it differentiates the output signal of the envelope detector (12) and outputs a signal pulse only when the change in amplitude of this output signal is in one direction. A bandpass filter (18) in the demodulator circuit passes, from a signal derived from an amplitude-dependent current from the amplitude limiter (10), the frequency component attributed to the duration of the modulation pulses. A comparator (20) compares the output signal of the bandpass filter (18) to a fixed threshold value and outputs a signal pulse when this output signal exceeds the threshold value. A logic circuit (15) outputs the signal pulse existing in each case as the demodulated signal.

4 Claims, 2 Drawing Sheets

DEMODULATOR FOR ASK-MODULATED SIGNALS HAVING SMALL MODULATION DEPTH

Figure 1:
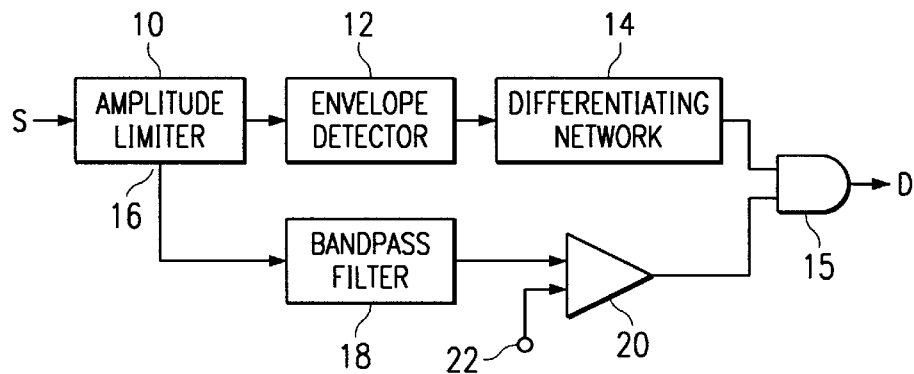

The invention relates to a demodulator circuit for demodulating a signal ASK-modulated with pulses equal in duration, and having a small depth of modulation and large dynamic range.

Most recently it has become increasingly popular to equip items such as the so-called "smart cards", luggage tags, labels on all sorts of goods or also on accessory items moved on conveyor belts with transponders serving to identify the item in each case by being read contactlessly. In swapping data between the transponders and the readers ASK modulation is made use of, among other things, involving keying a carrier generated with constant amplitude, i.e. keying it ON/OFF as a function of the data to be transferred. This keying results in a 100% depth of modulation, meaning that the carrier has either its full amplitude or zero amplitude. Such a large depth of modulation produces, however, a relatively wide frequency spectrum with sidebands whose levels violate FCC regulations in the frequency range provided for this special application. One possibility of reducing the sideband levels consists of reducing the depth of modulation, for example, down to 10% so that only a 10% difference exists between the full amplitude of the carrier and the modulated amplitude of the carrier.

However, the lower depth of modulation to be preferably used causes demodulation problems in the cited applications since it is in these applications that the demodulation needs to handle a very large dynamic range of the received signal on the part of the demodulator in the transponder. The spacing between the reader and the transponder is namely not always constant, it instead possibly being greatly different. When the transponder is located near to the reader, the signal transmitted thereto is received at a very high level, whilst where larger distances are involved the level received may assume very small values. To avoid the demodulation input from being overridden an amplitude limiter is usually provided to ensure that the received signal can be further processed without swamping subsequent stages. In the case of a low depth of modulation of, say, 10%, however, it may happen that the received level lies above the response threshold of the limiter in both the unmodulated portion of the carrier and in the modulated portion so that after limiting the amplitude the system is unable to "see" any difference between the modulated and unmodulated portion of the carrier, the output signal of the amplitude limiter then being namely a signal having constant amplitude.

The invention is thus based on the object of providing a demodulator circuit enabling ASK-modulated signals to be demodulated even when these signals have only a small depth of modulation and are received with a large dynamic range.

This object is achieved in accordance with the invention by a demodulator circuit for demodulating a signal ASK-modulated with modulation pulses equal in duration, and having a small depth of modulation and large dyamic range comprising an amplitude limiter through which an amplitude-dependent current flows when the amplitude of the signal to be demodulated exceeds its limiting threshold value, an envelope detector to the input of which the signal to be demodulated is applied, a differentiating network configured so that it differentiates the output signal of the envelope detector and outputs a signal pulse only when the change in amplitude of this output signal is in one direction, a bandpass filter passing, from a signal derived from amplitude-dependent current from the amplitude limiter, the frequency component attributed to the duration of the modulation pulses, a comparator comparing the output signal of the bandpass filter to a fixed threshold value and outputting a signal pulse when this output signal exceeds the threshold value, and a logic circuit outputting the signal pulse existing in each case as the demodulated signal.

The demodulator circuit in accordance with the invention enables a signal characterizing the presence of a modulation pulse to be generated when the amplitude limiter is already active due to a high input signal level not only when the input signal level is below the limiting threshold value of the amplitude limiter, but also to output such a signal when limiting the amplitude has been activated so that the amplitude limiter furnishes at its output a signal remaining constant in amplitude. This is achieved by making use of the fact that, on activation of limiting, a current flows through the amplitude limiter, the magnitude of which differs depending on the amplitude of the limited signal, i.e. the signal to be demodulated.

Advantageous further aspects of the invention are characterized in the sub-claims.

Figure 2:
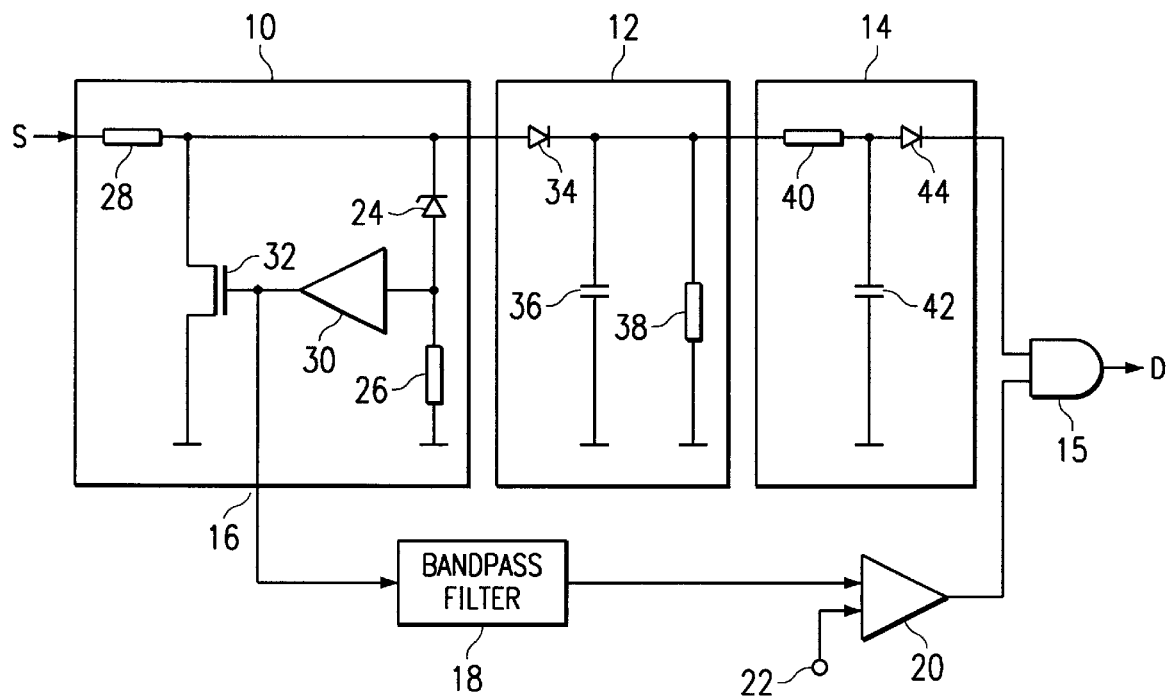

An embodiment of the invention will now be discussed with reference to the drawing in which:

FIG. 1 is a block diagram explaining the principle of the demodulator circuit in accordance with the invention, FIG. 2 is a more detained circuit diagram of the demodulator circuit in accordance with the invention and FIGS. 3A–3G illustrate time plots of signals as they materialize at various points in the circuit as shown in FIG. 1 under specific operating conditions.

Referring now to FIG. 1 there is illustrated an amplitude demodulator serving to demodulate signals as received in a transponder from a reader and modulated by amplitude-shift-keying (ASK) in which the amplitude changes between two values as a function of the data to be transmitted. The special feature in transferring the data in this way from a reader to a transponder is that, depending on the the distance away of the reader, the signals are received in the transponder with a higher or lower field strength, i.e. over a wide dynamic range. In addition, only a small depth of modulation of, for example, 10% is used in reducing unwanted radiation.

So that the amplitude demodulator is also able to handle signals received at the signal input S with a high field strength without being overridden, there is provided in the amplitude demodulator as shown in FIG. 1 an amplitude limiter 10 having a fixed limiting threshold value to which the signal to be demodulated is limited when its amplitude exceeds the threshold value. How demodulation is still possible following activation of such a limiting action in the case of a small depth of modulation will now be detailed. For demodulating signals received with an amplitude below the limiting threshold value an envelope detector 12 is provided which detects the received signal and generates a signal corresponding to the envelope of the detected signal. with the aid of differentiation by the differentiating network 14 pulses are generated at the transitions between a high amplitude value and a 10% lower amplitude value produced by the modulation, the differentiating network 14 being configured to only output a pulse when a leading or trailing edge is present which may be simply achieved by a repeat detection of the output signal of the differentiating network 14. The output pulses of the differentiating network 14 are output via an OR circuit 15 to the data output D where they are further processed for decoding the received data.

The amplitude limiter 10 is configured so that on activation of the limiting action it furnishes at its output 16 a signal which is a function of the amplitude of the signal to be demodulated. Referring now to FIG. 2, the way in which this signal is generated will now be discussed. This signal at the output 16 contains a frequency corresponding to the carrier frequency of the signal to be demodulated, it also contains a frequency component generated by the modulation. Assuming that due to modulation the amplitude of the carrier signal is reduced by the depth of modulation of, say, 10% for a predetermined duration in each case, then—since the frequency component to be attributed to the modulation is inversely proportional to the predetermined duration for which the reduction in amplitude occurs, for the carrier signal being sent at a frequency of approx. 13 MHz, for example, and a 10% reduction in the carrier amplitude for the duration of 10 $\mu$s is affected by the modulation—a frequency component of 100 kHz is also contained in the output signal of the amplitude limiter. This frequency component may be filtered out with the aid of the bandpass filter 18 so that at the output of this bandpass filter 18 pulses will always appear in each case when the 100 kHz component is present in the output signal of the amplitude limiter. In a comparator 20 the output signal of the bandpass filter 18 is compared to a fixed reference threshold applied to the second input 22 of the comparator 20, the comparator 20 always furnishing an output signal when the output signal of the bandpass filter 18 exceeds the reference threshold, thus preventing noise signals or other unwanted signals having a low amplitude from being transferred as demodulated data to the OR circuit 15 and further to the data output D.

The individual blocks of the amplitude demodulator as shown in FIG. 1 are evident in more detail from FIG. 2 to illustrate their internal circuitry, where necessary.

Referring now to FIG. 2 it is evident that the amplitude limiter 10 contains a Zener diode 24 connected in series to a resistor 26. Together with the dropping resistor 28 the Zener diode forms a basic circuit for stabilizing and thus limiting the voltage furnished at the output of the amplitude limiter 10. The limiting action is activated as soon as the voltage appearing at the cathode of the Zener diode 24 exceeds the Zener voltage thereof. On the Zener voltage being exceeded a current as a function of the amplitude of the signal to be limited flows through the Zener diode 24, this current also flowing through the resistor 26 so that a drop in voltage as a function of the amplitude occurs across this resistor. This drop in voltage is amplified by an amplifier 30 and is available at the output 16 of the amplitude limiter 10 as a voltage-dependent signal. The output signal of the amplifier 30 is also applied to the gate of a field-effect transistor 32, the source-drain circuit of which is connected between the cathode of the Zener diode 24 and ground. The MOS transistor 32 functions as a steerable resistor which grounds the voltage-dependent portion of the current flowing through the dropping resistor 28. It is in this way that a closed loop materializes which clamps the current flowing through the Zener diode 24 to a desired low value even in the case of high received field strengths, thus taking into account the wide dynamic range with which the signal to be demodulated may be received. The dynamic range of the current flowing through the Zener diode 24 is thus significantly reduced. Despite this, it is from this current—via the drop in voltage across the resistor 26—that a signal as a function of the amplitude of the signal to be demodulated is still derivable for further processing.

In its simplest configuration the envelope detector 12 consists of a detector diode 34 which detects the signal to be demodulated, as well as the parallel connection of capacitor 36 and a resistor 38 which integrates the signal detected by the diode 34 so that the output signal of the envelope detector 12 corresponds to the envelope of its input signal.

As evident from FIG. 2 the differentiating network 14 in its simplest configuration consists of a RC pad, a resistor 40 and a capacitor 42 which generates a pulse for each edge existing in the envelope of the signal to be demodulated. The diode 44 also contained in the differentiating network 14 ensures that the pulses appearing at the output of the differentiating network 14 are only those which are generated by the positive edge of the envelope, these positive pulses then being passed on via the OR circuit 15 as the output signals intended for further processing.

As already explained above, the signal appearing at the output 16 of the amplitude limiter 10 contains the frequency component corresponding to the carrier frequency as well as a further frequency component attributable to the modulation pulses. Since the modulation pulses are equal in duration this frequency component has a value which is inversely proportional to this duration, the comparator in the cited example being a 100 KHz comparator. This frequency component is filtered out by the bandpass filter 18 and applied to the comparator 20 which, as likewise explained above, will always pass on an output signal to the OR circuit 15 when the output signal of the bandpass filter is greater than the threshold value applied to its reference input 22. Since the configuration of a bandpass filter, comparator and OR circuit are taken to be known, no further comments are made in this respect.

Figure 3A:
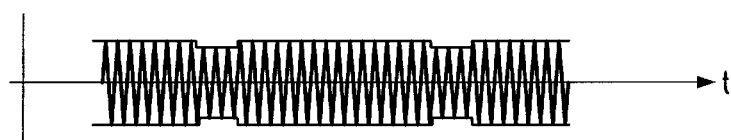

For a better understanding of how the amplitude demodulator as shown in FIG. 1 works, reference is now made to FIGS 3A–3G depicting time plots of signals as they appear at the various points in the circuit as shown in FIG. 1. FIG. 3A shows an amplitude-modulated carrier signal modulated with a small depth of modulation by pulses of equal duration, whereby the data to be transferred in this example application assumed in this case is transferred not by the the absolute amplitude values or the duration of the modulation pulses but by the position in time of the modulation pulses relative to a transponder. This kind of data transfer is known as pulse position coding and thus requires no further elaboration.

The amplitude demodulator as evident from FIG. 1 has the task of detecting the modulation pulses contained in the carrier signal by the drop in amplitude and to output a signal whenever such a modulation pulse exists.

Figure 3B:
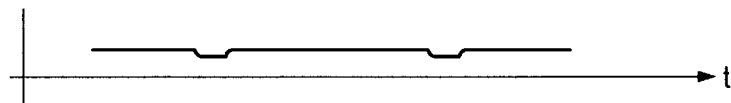
Figure 3C:
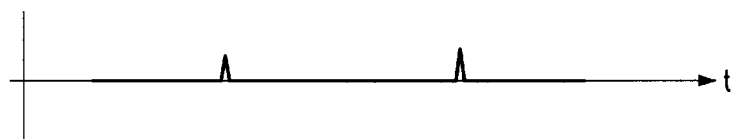

In first considering the case in which the field strength received by the transponder is so low that the limiting threshold value of the amplitude limiter 10 fails to be exceeded, the amplitude limiter 10 is accordingly without effect so that the signal to be demodulated, as shown in FIG. 3A, gains access to the envelope detector with no change in shape by the signal as shown in FIG. 3B being generated by detection and integration.

On each edge of the envelope signal the RC pad 40, 42 in the differentiating network 14 generates a pulse, the diode 44 in the differentiating network 14 ensuring, however, that at the output of the latter only the pulses produced by the leading edges are output. These pulses then gain access via the OR circuit 15 to the data output D and may be applied to the decoder circuit. These output pulses are evident from FIG. 3C.

Figure 3D:
Figure 3E:
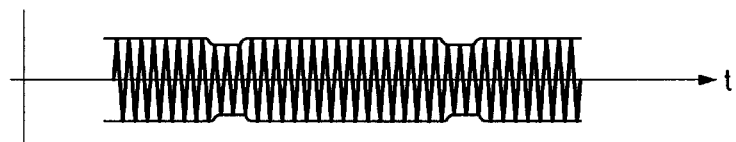
Figure 3F:
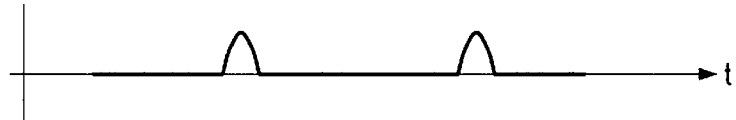
Figure 3G:
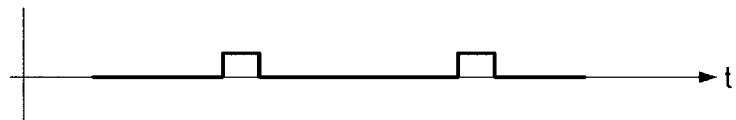

Assuming now that the signal to be demodulated is received with a high field strength exceeding the limiting threshold value of the amplitude limiter 10 and activating the limiting action of the Zener diode 24, a signal having constant amplitude, as shown in FIG. 3D will then appear at the output of the amplitude limiter 10. Since the envelope of this signal shows no change in amplitude the differentiating network 14 responding only to changes in the signal will, of course, not output any pulses. In this case the branch of the circuit containing the bandpass filter 18 and the comparator 20 becomes active since, as explained above, at the output 16 of the amplitude limiter 10 a signal appears from which the modulation information is derivable. Shown in FIG. 3E is the signal as it appears at the output 16 of the amplitude limiter 10. The shape of this signal corresponds in principle to that of the input signal of the amplitude limiter. The bandpass filter 18 will always output a useful signal when this frequency component is present in its input signal, this being indicated schematically in FIG. 3F. The output signal of the bandpass filter 18 is compared to a reference threshold in the comparator 20 which applies an output signal to the OR circuit 15 and thus to the data output D of the amplitude demodulator whenever the output signal of the bandpass filter 18 exceeds the reference threshold. It is in this way that any noise existing at the output of the bandpass filter may be suppressed.

With the aid of the amplitude demodulator as described it is thus possible to reliably demodulate ASK-modulated signals received in a large dynamic range and exhibiting only a small depth of modulation.

What is claimed is:

1. A demodulator circuit for demodulating a signal ASK-modulated with modulation pulses equal in duration, and having a small depth of modulation and large dynamic range comprising an amplitude limiter (10) through which an amplitude-dependent current flows when the amplitude of the signal to be demodulated exceeds its limiting threshold value, an envelope detector (12) to the input of which said signal to be demodulated is applied, a differentiating network (14) configured so that it differentiates the output signal of said envelope detector (12) and outputs a signal pulse only when the change in amplitude of this output signal is in one direction, a bandpass filter (18) passing, from a signal derived from said amplitude-dependent current from said amplitude limiter (10), the frequency component attributed to the duration of the modulation pulses, a comparator (20) comparing the output signal of said bandpass filter (18) to a fixed threshold value and outputting a signal pulse when said output signal exceeds the threshold value, and a logic circuit (15) outputting the signal pulse existing in each case as the demodulated signal.

2. The demodulator circuit as set forth in claim 1, characterized in that said amplitude limiter (10) contains a Zener diode (24) dictating said limiting threshold value by its Zener voltage and a resistor (26) connected in series therewith across which a drop in voltage is generated from said amplitude-dependent current when the amplitude of said signal to be demodulated exceeds said Zener voltage of said Zener diode, said drop in voltage being applied to said bandpass filter (18) as the signal to be filtered.

3. The demodulator circuit as set forth in claim 2, characterized in that prior to being applied to said bandpass filter (18) said drop in voltage is amplified by an amplifier (30), the output signal of which is applied also to the steering connection of a steerable resistor (32) which in parallel to said series connection of said Zener diode (24) and said resistor (26) grounds a portion of said signal to be demodulated at the input of said amplitude limiter (10) as a function of said drop in voltage across said resistor (26) connected in series with said Zener diode (24) for reducing the dynamic range of said signal by changing its resistance value inversely in ratio to said amplitude of said signal to be demodulated.

4. The demodulator circuit as set forth in claim 3, characterized in that said steerable resistor (32) is a MOS field-effect transistor, the gate of which is connected to said output of said amplifier (30).

* * * * *